3,150,360
FLOWMETER ALARM
Wallace I. Stenzel, Milwaukee, Wis., assignor to Waukee Engineering Co., Milwaukee, Wis., a corporation of Wisconsin
Filed Oct. 23, 1961, Ser. No. 146,733
6 Claims. (Cl. 340—239)

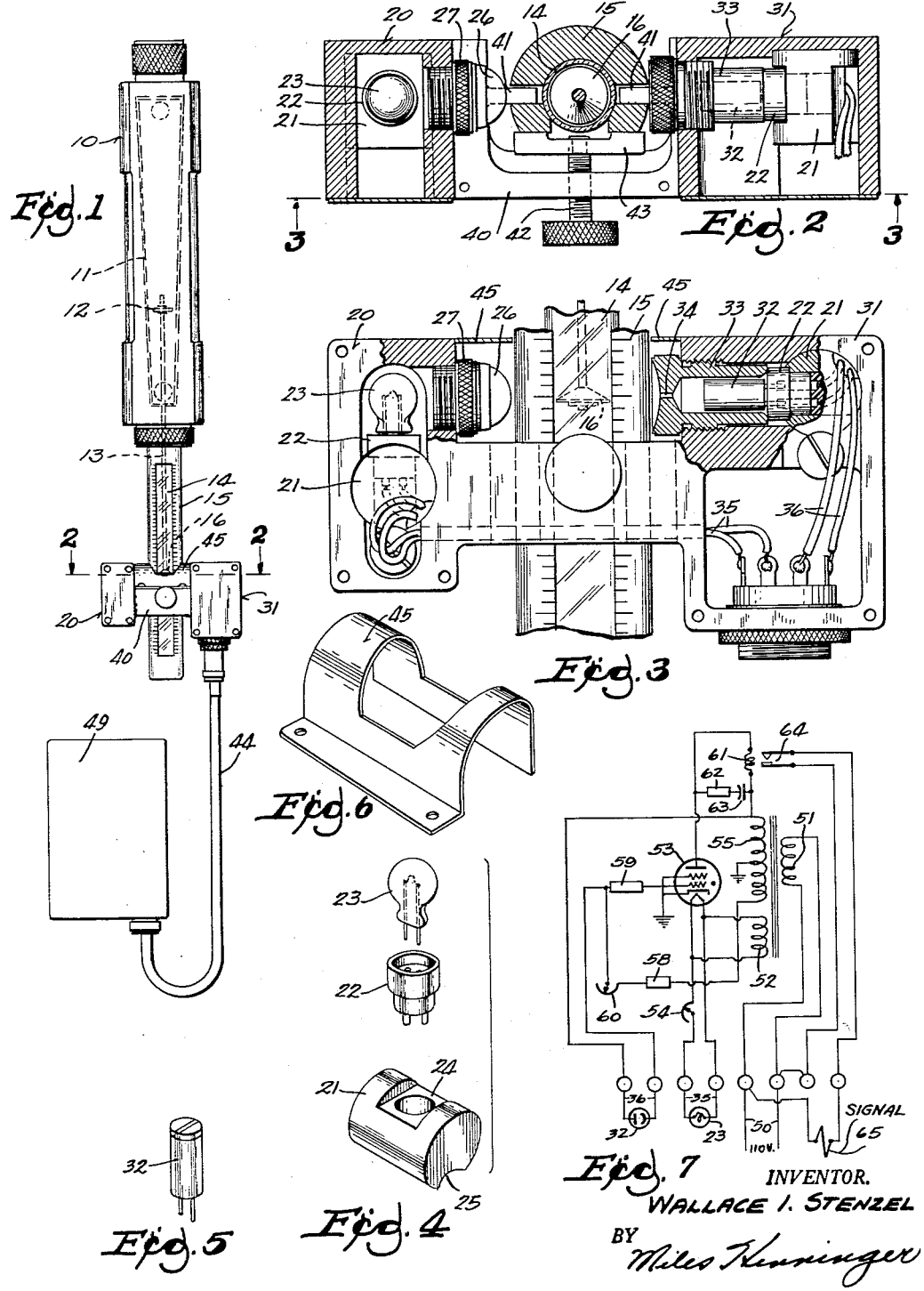

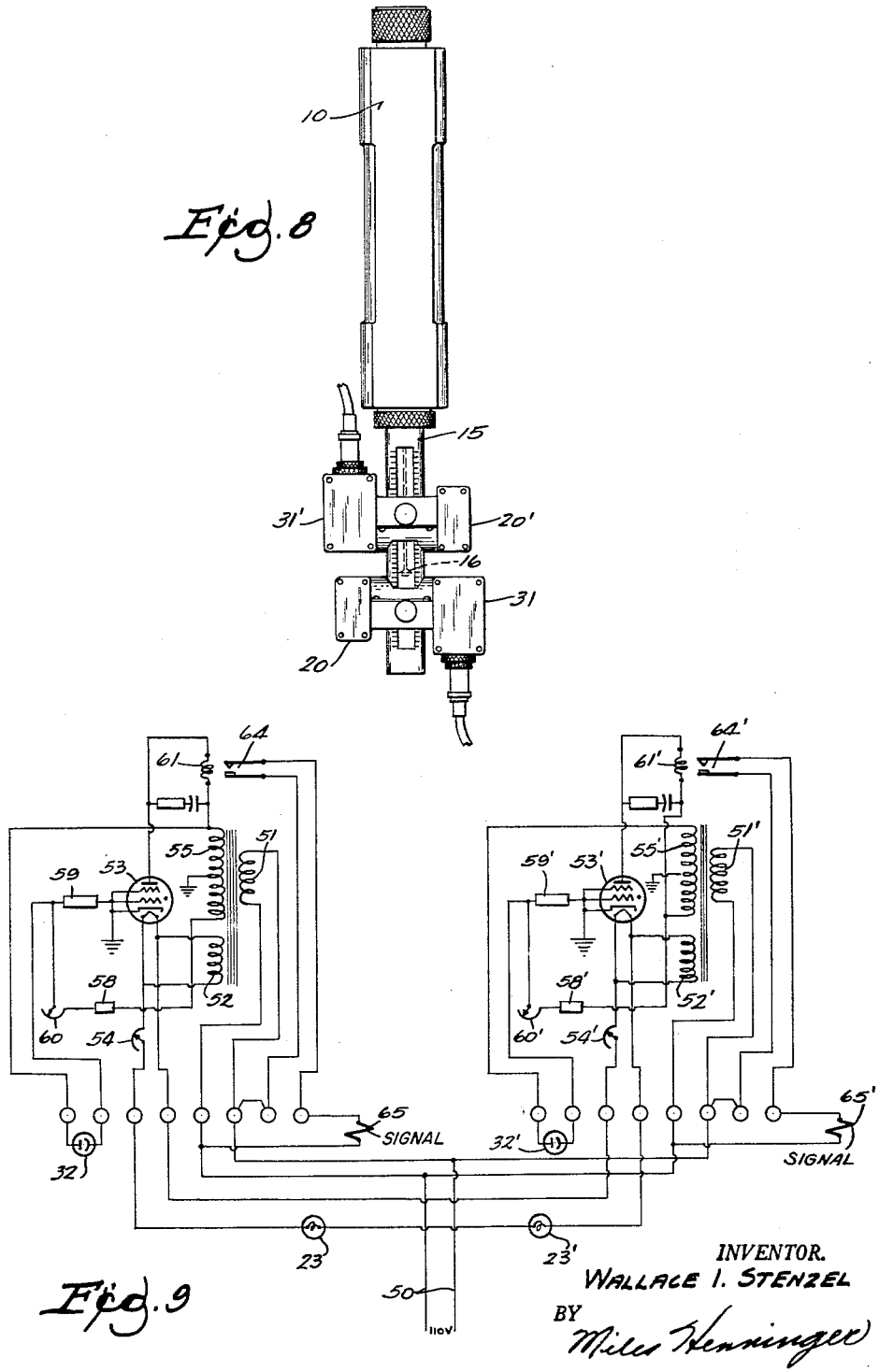

This invention relates to improvements in an alarm device for gas flowmeters, by which volume of flow of gas beyond a high value or a low value or both such values, actuates a signal and in which any failure of any component of the device also gives a signal.

Gas flowmeters now in operation have an element responsive to flow, which includes a pointer moving in a transparent portion of the flowmeter and adjacent a scale. The present device is adapted to be mounted adjacent the scale for such flowmeters now in use and to be adjusted along the scale to a desired position, the scale also serving as a guard for the transparent flowmeter portion. A light beam originating in the device passes through the the transparent flowmeter portion and inpinges on a photocell so long as the beam is not interrupted by the pointer. The light beam is concentrated and shielded before entering into an aperture member which imposes a mechanical limitation on the actual position and diameter of the beam transmitted whereby the effect of ambient light on the photocell is minimized. The pointer is opaque and one moves into the light beam when a given value of gas flow is exceeded or is not met, and thus causes the giving of the signal. However, the pointer may also have a number of transparent sections so placed that the light beam is interrupted (by adjacent opaque sections) at two values such as the high and low values of a range.

Identical mounting blocks are used to hold like sockets into which are respectively plugged a light bulb and a photocell and the blocks fit into the housing in only one position and thus locate the bulb and cell accurately within a housing and maintain such positioning. A lens concentrates and focuses the light beam on a sleeve member with an aperture in the end thereof, which is aligned with the photocell light sensitive area so that maximum sensitivity of the photocell to the light beam is obtained while minimizing the effect of ambient light. The bulb and the photocell are connected with an amplifier for the electric current of the photocell, for operating a relay to control the supply of power to a signalling device. The circuit is so designed as to cause operation of the relay if the intensity of the light beam is below (or above) a given amount and if any portion of the circuit fails. Under some conditions of a gas being measured or of the ambient light, it may become necessary to change the intensity of the light beam and a potentiometer is accordingly placed in circuit with the filament of the light bulb for that purpose. A potentiometer may also be placed in the photocell circuit to change photocell sensitivity as gas or ambient light conditions change. Several identical devices may be mounted on a flowmeter to give signals when the gas value reaches the end of a given range.

In the drawings:

FIG. 1 is an elevation of a known type of gas flowmeter to which the present alarm device is adapted, and shows the two major sub-assemblies of the device.

FIG. 2 is a view in section on line 2—2 of FIG. 1 and with a light shield removed, FIG. 3 is a view partially in elevation and partially in section on 3—3 of FIG. 2, FIG. 4 is a perspective view of a mounting block for the light bulb and its socket and leads, FIG. 5 is a perspective view of the photocell used, FIG. 6 is a perspective view of a light shield extending between the light bulb and the photocell, FIG. 7 is a diagram of the electric circuit for energizing the bulb, the photocell, the amplifier, the relay and the signal means.

FIG. 8 is a fragment of an elevation similar to FIG. 1 but showing use of two of the present alarm devices, and FIG. 9 is an electric circuit showing how the two alarms are interconnected.

Referring specifically to the drawings, the gas flowmeter itself comprises a casing 10 having a tapered chamber 11 connected in a gas flow line so that the gas flowing tends to lift a disk 12. The disk 12 has an elongated stem 13 extending into a transparent tube 14 which is substantially enclosed in a guard-scale 15 and the stem bears a pointer 16 for indicating the position of the disk 12 relative to the scale 15. The disk 12, stem 13 and pointer 16 are the equivalent of any generic "pointer" and the tube 14 is the equivalent of any transparent flowmeter portion co-acting with a pointer and a scale. Obviously the transparent portion of the flowmeter need not be tubular and the pointer need not be of the construction herein disclosed but may e.g. be of the type swinging on a pivot and such constructions are equally useful with the present device.

The alarm device comprises a housing 20 receiving a mounting block 21 into which a socket 22 is set for plugging in a lamp bulb 23. The mounting block 21 is cut out to form a seat 24 positioning the socket relative to the block, and to provide a groove 25 giving just a sufficient space for electrical leads to the socket. The housing 20 is so shaped as to receive the block 21 and the parts mounted thereon in only one position which brings the bulb 23 in front of a light concentrating lens 26 in a holder 27 threaded into an aperture in the housing. A similar housing 31 receives a mounting block and a socket such as above described for plugging in a photocell 32 (see FIG. 5) of which the light sensitive area is substantially the entire end of the cell. The housing 31 is also formed to receive its block, and socket and photocell in only one position and to retain the photocell in such position. A sleeve 33 extends through an aperture in the housing 31 and receives the photocell 32 for holding such cell coaxially with the sleeve. The sleeve extends to adjacent the transparent portion of the flowmeter and the outer end of the sleeve is made conical and provided with a central aperture 34 of considerably less area than the photosensitive area of the photocell so that the photocell requires alignment with the aperture to secure most effective action of the beam of light. The housing 31 also provides a space for leads 35 and 36 from the light bulb 23 and the photocell 32.

A connecting member 40 for the housings 20 and 31 has tongues 41 (see FIG. 2) entering slots in the opposite sides of the opaque guard-scale 15 and carries a screw 42 with a lock-bar 43 for bearing on the guard-scale to hold the alarm in adjusted position on the scale. The member 40 also provides a conduit for enclosing the leads 26 to the light bulb. The connecting member 40 also bears a light shield 45 which encloses the portions of the lens 26 and the sleeve 33 outside of the housings 20 and 31, in such manner as to reduce the amount of ambient light penetrating to the vicinity of the lens and sleeve.

Bulb leads 35 and photocell leads 36 extend through a conduit 44 to a box 49 in which is mounted an amplifier for the electric current transmitted by the photocell, together with a relay and a multi-winding transformer for reducing a 110 volt alternating current supply to suitable voltage for the amplifier and the relay. An A.C. supply line 50 connects to the primary winding 51 of the transformer, of which the secondary winding 52 is connected with the filament of a known type of rectifying electronically controlled tube 53, and the secondary winding 52 is connected with the light bulb 23 by way of a potentiometer 54 for controlling the flow of current to the bulb. Fixed resistors 58 and 59 and a potentiometer 60 connect one end of the transformer winding 55 with the various grids of the rectifier-amplifier 53 and with one side of the photocell 32, while the other side of the photocell is connected with the other end of the transformer winding 55. The plate of the rectifier-amplifier tube 53 is connected with one end of relay winding 61 and the other end of such winding is connected with transformer winding 55, a resistor 62 and a capacitor 63 being connected in parallel with the relay winding. Normally open relay contacts 64 are shown for controlling application of the 110 volt A.C. to a signal device 65 which may be any known electrically operable audible or visible signal or combinations thereof. Thus the normally open contacts 64 will give a signal whenever the pointer 16 interrupts the light beam as it rises and drops due to change in gas flow.

FIG. 8 illustrates how identical alarm units are applied to a flowmeter to register the end values of a range as the pointer moves up and down. The units are identical with that previously illustrated and described so that the parts of the units are designated by the same reference numerals, excepting that prime numerals are applied to the upper unit which is in reverse position relative to the lower unit. The circuits of the two units are similar (but not identical) and the parts thereof are again designated by the same numerals and prime numerals. Thus light bulb 23 of the lower unit and light bulb 23' of the upper unit are connected in series and the one A.C. power supply line is connected with both units. The connection with transformer winding 55 and 55' are reversed to change the phase of the power supply to the photocell and the grid connected therewith. Further, each unit also has its own alarm device 65 and 65' so that the user may identify which of the signals has been operated.

It is obvious from the above that the first structure provides positive means for insuring correct assembly of the parts in given position in the housings 20 and 31. The light beam is so directed and concentrated and centered on the photocell that there is the greatest sensitivity to the beam and the least sensitivity to ambient light. If, for any reason, the intensity of the light beam is to be varied, means are provided for controlling the flow of current to the light bulb. The flow indicating pointer is easily made transparent at different points and used with a number of relays to allow the end values of a range to be supervised, as well as a single value as above described. In the circuit shown, failure of any electrical element deenergizes the relay winding so that the normally open contacts close to give a signal and the circuit "fails safe."

I claim:

1. A device for signalling change from a given value in a gas flow indicated by movement of a pointer in a transparent portion of a flowmeter, the device comprising a guard substantially enclosing the transparent flowmeter portion, the guard being opaque and having opposite slots therethrough, a housing having two cavities severally opening opposite the guard slots and having tongues extending into the guard slots for positioning the housing on the guard, a light bulb in one of the cavities for projecting a beam of light through the transparent flowmeter portions and the guard slots, a photocell in alignment with the light bulb in another of the cavities for receiving the beam of light from one of the guard slots and reducing electrical resistance of its light sensitive area upon impingement of light thereon, the pointer interrupting the beam of light upon pointer movement responsive to change in the gas flow value, signalling means to be actuated upon interruption of the beam of light by the flowmeter pointer, a relay for controlling actuation of the signal means, and an electronic circuit for amplifying the electric current passed by the photocell and thereby operating the relay upon interruption of the beam of light by the pointer.

2. The signalling device of claim 1 in which identical mounting blocks and sockets are severally placed in the housing cavities for severally positioning the light bulb and the photocell in given positions in axial alignment in the cavities.

3. The signalling device of claim 1 in which a condensing lens is mounted in the cavity over the light bulb and extends adjacent a guard slot for reducing the cross section of the beam of light and directing it into the guard slot.

4. The signalling device of claim 1 in which a sleeve inclosing the photocell has an end extending adjacent a guard slot and the end is provided with an aperture of less area than the light sensitive area of the photocell.

5. The signalling device of claim 1 in which a light condensing lens is mounted over the light bulb and extends adjacent one guard slot and a sleeve encloses the photocell and has an end extending adjacent the other guard slot, the sleeve end being provided with an aperture therethrough and the lens and the sleeve aperture being substantially co-axial.

6. The signalling device of claim 1 in which a light condensing lens is mounted over the light bulb and extends adjacent one guard slot and a sleeve encloses the photocell and has an end extending adjacent the other guard slot, the sleeve end being provided with an aperture therethrough and a shield extending around the transparent flowmeter portion and partially enclosing the lens and the end of sleeve for reducing the effect of ambient light on the photocells.

References Cited in the file of this patent

UNITED STATES PATENTS

| | | |
|---|---|---|
| 1,570,179 | Prouty et al. | Jan. 19, 1926 |
| 1,955,315 | Styer | Apr. 17, 1934 |
| 2,070,617 | Offutt | Feb. 16, 1937 |
| 2,091,303 | Brelsford | Aug. 31, 1937 |
| 2,197,190 | Mott-Smith | Apr. 16, 1940 |
| 2,561,802 | Klug | July 24, 1951 |
| 2,625,658 | Robinson | Jan. 13, 1953 |
| 2,898,802 | Ljungberg et al. | Aug. 11, 1959 |
| 3,040,980 | Mann et al. | June 26, 1962 |

FOREIGN PATENTS

| | | |
|---|---|---|
| 1,071,359 | Germany | Dec. 17, 1959 |

OTHER REFERENCES

The Review of Scientific Instruments: vol. 31, No. 7; July 1960; FIG. 1, page 724.